Oct. 30, 1962
G. P. KAZOKAS
3,061,416
CATALYTIC MUFFLER
Filed Nov. 22, 1957
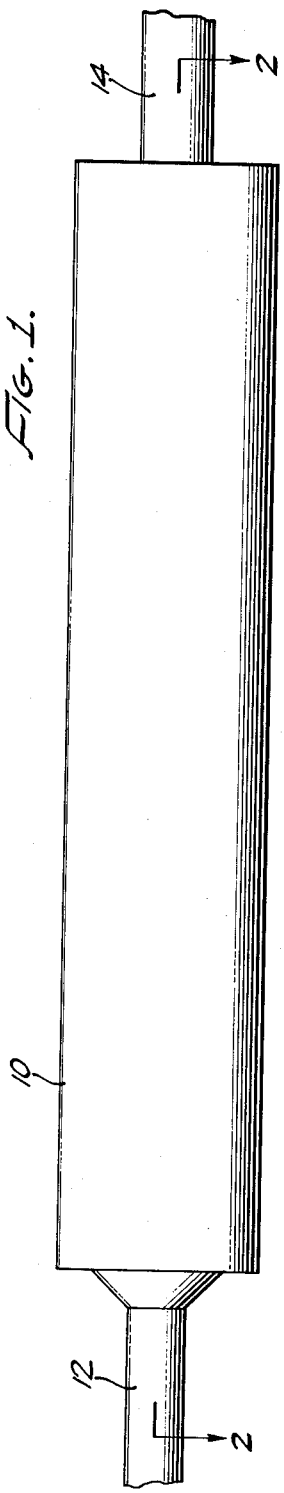
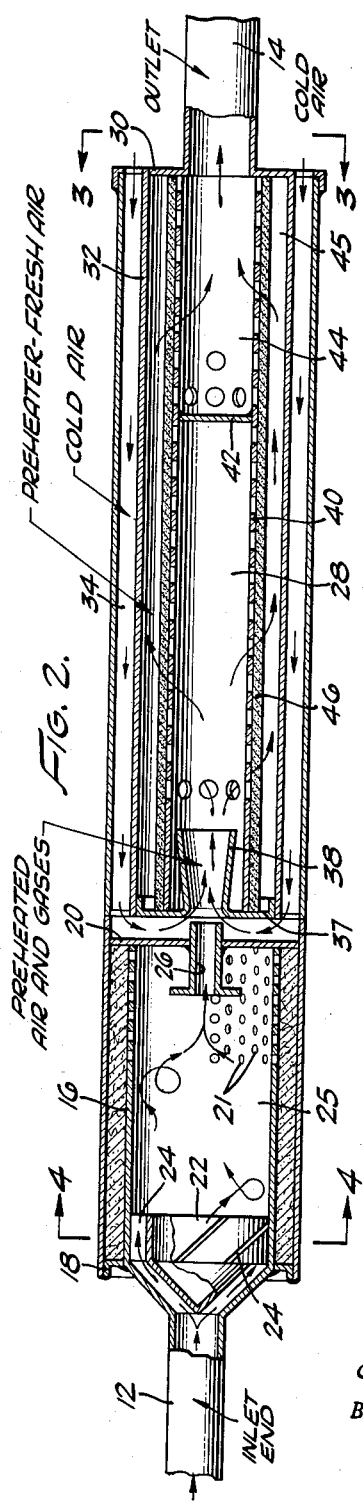
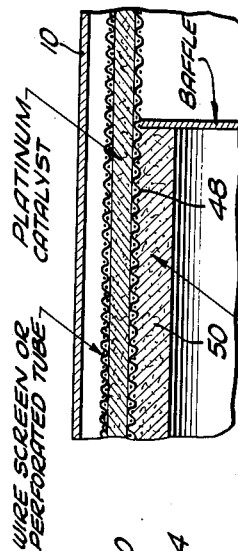
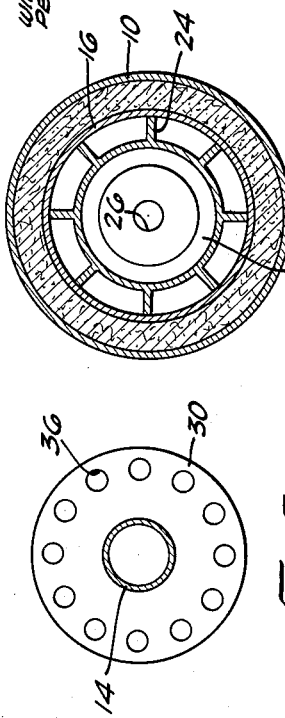
INVENTOR.
GEORGE P. KAZOKAS
BY
*Lyon & Lyon*
ATTORNEYS United States Patent Office 3,061,416
Patented Oct. 30, 1962

3,061,416
CATALYTIC MUFFLER
George P. Kazokas, 1225 4th Ave., Los Angeles 19, Calif.
Filed Nov. 22, 1957, Ser. No. 698,266
3 Claims. (Cl. 23—288)

This invention relates to an improved catalytic exhaust muffler.

It is an object of this invention to provide a device which will receive exhaust gases from an internal combustion engine and completely oxidize same before releasing same to the atmosphere.

It is a further object of this invention to provide such a device wherein the exhaust gases are mixed with preheated air and passed through a catalyst to complete the combustion thereof.

It is still a further object of this invention to provide means for removing lead compounds from such exhaust gases before passing same through the catalyst to avoid poisoning the catalyst.

Other objects and advantages will be readily apparent from the following description:

In the drawings:

FIGURE 1 is a plan view of the muffler.

FIGURE 2 is a section taken along line 2—2 of FIGURE 1.

FIGURE 3 is a view taken along line 3—3 of FIGURE 2.

FIGURE 4 is a view taken along line 4—4 of FIGURE 2.

FIGURE 5 is a fragmentary view similar to FIGURE 2 of a modification.

The muffler has an outer cylindrical body 10 having an inlet pipe 12 and an outlet pipe 14. Exhaust gases from an internal combustion engine are introduced through pipe 12. In automobiles tetraethyl lead is added to the fuel which results in the exhaust gases containing lead compounds. Such lead compounds have a deleterious effect on the catalyst utilized in the muffler, in effect poisoning the catalytic action, hence same must be removed.

There are three methods for removing these lead compounds, filtering, electrostatic precipitation and centrifugal separation. Either of the first two methods alone involves outsized equipment particularly for use on an automobile, consequently, a centrifugal separator is preferably utilized in this embodiment. At the inlet extremity of the body 10 an inner cylinder 16 is provided spaced from outer body 10 by webs 18 and 20. Cylinder 16 is provided with a large number of perforations 21 at the lower front extremity thereof. As the exhaust gas leaves pipe 12 to enter the separator it passes into annulus 22 within which are mounted a plurality of curved vanes 24. A rotary or swirling motion is imparted to the gas by passing between the vanes 24 which causes the relatively heavy lead compounds to move outwardly through perforations 21 thereby separating same from the remainder of the exhaust gases in separating chamber 25 formed between web 20 and gas inlet vanes 24. An outlet 26 is centrally located within web 20 to permit the exhaust gases to pass from the separator chamber into a mixing chamber 28.

A cap 30 is mounted upon the extremity of pipe 14 which closes the outlet extremity of body 10. This cap has a tube 32 concentric with but of smaller diameter than body 10 forming an annular air passage 34 between body 10 and tube 32. A plurality of apertures 36 in cap 30 permit air to enter passage 34. Tube 32 terminates in a web 37 spaced from web 20 and is provided with suitable apertures to permit air to flow from passage 34 to the space between webs 20 and 37. The web 37 has a flared nozzle 38 aligned with nozzle 26 so that flow of the hot exhaust gases from the separator chamber 25 to mixing chamber 28 draws preheated air into the muffler and mixes same with the exhaust gases to provide a source of oxygen for complete combustion. To avoid excess cooling of the exhaust gas upon mixing of air therewith the path of entry of the air is opposite to the movement of the exhaust gases and in heat transferring relation therewith through tube 32 so that the air is preheated before such mixing. This also functions as a shield against the high temperatures of the exhaust gases.

Positioned within tube 32 is a second perforated tube 40 which extends from cap 30 to web 37 and receives therein the discharge extremity of nozzle 38. A baffle 42 in tube 40 forms an extremity of chamber 28 and of exhaust chamber 44 which communicates with outlet pipe 14.

The exhaust gases mixed with air pass through the perforations in tube 40 into the space between such tube and tube 32 and out perforations in tube 40 into exhaust chamber 44 and hence out pipe 14. In the space between tubes 32 and 40 which form a catalytic chamber 45 a catalyst 46 is positioned. One example of a suitable catalyst is ceramic fiber such as described in United States Patents No. 2,714,622 and No. 2,674,539 upon which is deposited platinum black. This depositing may be accomplished by immersing the fiber in a 1.0% solution of chloroplatinic acid ($H_2PtCl_6$), drying same and reducing the deposited platinum salt by a gas flame. Other metals may be utilized which have a catalytic effect such as ruthenium, iridium, palladium, etc., which are well known in the art. Also a different carrier for the catalyst 46 may be substituted for the ceramic fiber which can withstand the temperatures developed.

In FIG. 5 a modified form of this invention is illustrated wherein a wire mesh 48 is substituted for a portion of tube 40. An additional filter 50 is supported in the wire mesh in chamber 28 to entrap any lead compound particles which were not separated previously to avoid same contacting the catalyst and thereby greatly reducing the catalytic action. Likewise a scavenger catalyst may be utilized in advance of the catalyst as is well known to those skilled in the art.

While what hereinbefore has been described is the preferred embodiment of this invention it is readily apparent that alterations and modifications can be resorted to without departing from the scope of this invention and such alterations and modifications are intended to be included within the scope of this invention.

I claim:

1. A muffler comprising: a body having an inlet and an outlet, a centrifugal separator adjacent said inlet, an outlet for said separator, a tubular means concentric with said body projecting from the outlet extremity thereof and terminating adjacent said outlet, the passage formed between said body and said tubular means permitting entry of air into said body, a nozzle supported in the extremity of said tube aligned with an outlet and a catalyst between said nozzle and said body outlet.

2. A muffler comprising: a body having an inlet and an outlet, a centrifugal separator adjacent said inlet, an outlet for said separator, a tubular means concentric with said body projecting from the outlet extremity thereof and terminating adjacent said outlet, the passage formed between said body and said tubular means permitting entry of air into said body, a nozzle supported in the extremity of said tube aligned with an outlet, a perforated tubular member within said tubular means receiving discharge from said nozzle, a baffle dividing said tubular member into mixing and exhaust chambers and a catalyst between the tubular means and tubular member.

3. A muffler comprising: a body having an inlet and an outlet, a centrifugal separator adjacent said inlet, an outlet for said separator, a tubular means concentric with said body projecting from the outlet extremity thereof and terminating adjacent said outlet, the passage formed between said body and said tubular means permitting entry of air into said body, a nozzle supported in the extremity of said tube aligned with an outlet, a perforated tubular member within said tubular means receiving discharge from said nozzle, a baffle dividing said tubular member into mixing and exhaust chambers, a catalyst between the tubular means and tubular member and filtering means between said mixing chamber and said catalyst.

References Cited in the file of this patent

UNITED STATES PATENTS

| | | |
|---|---|---|
| 1,932,927 | Fischer | Oct. 31, 1933 |
| 1,953,120 | Miller | Apr. 3, 1934 |
| 1,985,713 | Bartlett | Dec. 25, 1934 |
| 2,187,741 | Houndry | Jan. 23, 1940 |
| 2,209,973 | Houndry et al. | Aug. 6, 1940 |
| 2,409,825 | Baringoltz | Oct. 22, 1946 |
| 2,673,446 | DeSalardi | Mar. 30, 1954 |
| 2,831,548 | Barkelew | Apr. 22, 1958 |

OTHER REFERENCES

"Particulate Pb Compounds in Auto Exhaust Gas," Ind. and Eng. Chem., vol. 49, No. 7, pages 1131–1142, July 1952.